United States Patent Office 3,597,505
Patented Aug. 3, 1971

3,597,505
ALKOXYIMINO PHOSPHONATES
Sidney B. Richter, Chicago, and Ephraim H. Kaplan, Skokie, Ill., assignors to Velsicol Chemical Corporation, Chicago, Ill.
No Drawing. Filed Aug. 29, 1968, Ser. No. 759,255
Int. Cl. A01n 9/36; C07f 9/40
U.S. Cl. 260—944    7 Claims

ABSTRACT OF THE DISCLOSURE

Compounds of the formula

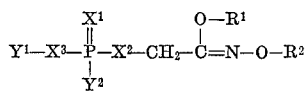

wherein $Y^1$ and $Y^2$ are independently selected from the group consisting of alkyl, alkenyl and

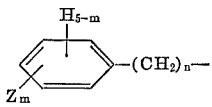

wherein Z is selected from the group consisting of alkyl, alkenyl, alkoxy, alkylthio, halogen, nitro, alkylsulfoxide, alkylsulfone and dialkylamino, $m$ is an integer from 0 to 5, and/$n$ is an integer from 0 to 3; $R^1$ and $R^2$ are alkyl; and $X^1$, $X^2$ and $X^3$ are independently selected from the group consisting of oxygen and sulfur. This invention also discloses insecticidal and acaricidal compositions comprising an inert carrier and, as an essential active ingredient, in a quantity toxic to insects and acarids, a compound of the above description; and further a method of destroying insects and acarids which comprises applying to said insects and acarids an aforedescribed insecticidal and acaricidal composition.

---

This invention relates to new chemical compositions of matter, and more particularly, relates to new compounds of the formula

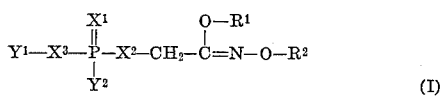

wherein $Y^1$ and $Y^2$ are independently selected from the group consisting of alkyl, alkenyl and

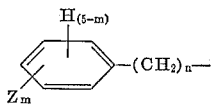

wherein Z is selected from the group consisting of alkyl, alkenyl, alkoxy, alkylthio, halogen, nitro, alkylsulfoxide, alkylsulfone dialkylamino, m is an integer from 0 to 5, and n is an integer from 0 to 3; $R^1$ and $R^2$ are alkyl; and $X^1$, $X^2$ and $X^3$ are independently selected from the group consisting of oxygen and sulfur.

In a preferred embodiment of this invention $Y^1$ and $Y^2$ are independently selected from the group consisting of lower alkyl, lower alkenyl and

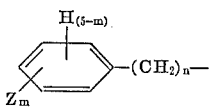

wherein Z is selected from the group consisting of lower alkyl, lower alkenyl, lower alkoxy, lower alkylthio, chlorine, bromine, nitro, lower alkylsulfoxide, lower alkylsulfone and di(lower alkyl)amino, $m$ is an integer from 0 to 3, and n is an integer from 0 to 3; $R^1$ and $R^2$ are lower alkyl; and $X^1$, $X^2$ and $X^3$ are independently selected from the group consisting of oxygen and sulfur. The term lower, as used herein, designates a straight or branched carbon chain containing a maximum of 10 carbon atoms.

The compounds of the present invention are unexpectedly useful as pesticides, particularly as insecticides and acaricides.

The compounds of the present invention can be readily prepared from compounds of the formula

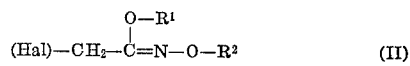

wherein Hal designates halogen, preferably chlorine or bromine, and $R^1$ and $R^2$ are as hereinabove described, by reaction with about an equimolar amount of an alkali metal phosphonate of the formula

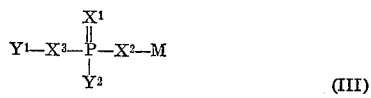

wherein M is an alkali metal and $Y^1$, $Y^2$, $X^1$, $X^2$ and $X^3$ are as heretofore described. This reaction can be effected by heating the reactants in an inert organic solvent such as methyl ethyl ketone at the reflux temperature of the reaction mixture for a period of from about 4 to about 24 hours. After the reaction is completed the reaction mixture can be filtered to remove the alkali metal halide which has formed. The desired product can then be conveniently recovered as a residue upon evaporation of the solvent from the remaining solution. The product can then be used as such or can be further purified by washing, distillation or chromatography if the product is an oil, or by trituration, recrystallization or other common methods well known in the art if the product is a solid.

The compounds of Formula II can be prepared from an alkoxyacetamide of the formula

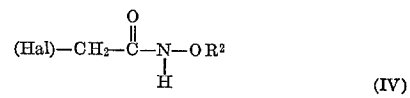

wherein Hal stands for halogen such as chlorine or bromine and $R^2$ is as hereinabove described, by reaction with a diazoalkane. This reaction can be effected by slowly adding a solution of the alkoxyacetamide of Formula IV with stirring to a slight molar excess of a solution of the diazoalkane at a temperature below about 15° C. and preferably at a temperature of from about −10° to about 10° C. Suitable solvents for the reactants are inert organic solvents such as ether, benzene or ether-ethanol mixtures, and the like. After the addition is completed, stirring can be continued for a short period to insure completion of the reaction. The desired product can then be recovered by evaporation of the solvents used and can then be used as such or can be further purified by conventional techniques well known in the art.

Exemplary diazoalkanes suitable for reaction with the alkoxyacetamides of Formula IV to form the compound of Formula II are diazomethane, diazoethane, diazo-n-propane, diazoisobutane, diazo-n-butane, diazo-n-pentane, diazo-n-hexane, diazo-n-octane, and the like.

Exemplary suitable alkoxyacetamides for preparing the compounds of Formula II are N-methoxy-α-chloroacetamide, N - ethoxy-α-chloroacetamide, N - isopropoxy-α-chloroacetamide, N-n-propoxy-α-bromoacetamide, N-butoxy-α-chloroacetamide, n-nonoxy-α-chloroacetamide, and the like.

The alkali metal phosphonates of Formula III which are used in the preparation of the compounds of the present invention can be prepared from the corresponding acid by the methods described by Malatesta and Pizzotti, Chimica e Industria (Milan) 27, 6–10 (1945), and Melnikov and Grapov, Zhur. Vsesoyuz Khim. Obshchestva in D. I. Mendeleeva, 6, No. 1; 119–20 (1961). Exemplary of suitable salts are:

Potassium O-methyl methylphosphonate
potassium O-ethyl ethylphosphonate
potassium O-methyl isopropylphosphonate
potassium O-n-propyl ethylphosphonate
potassium O-n-pentyl n-butylphosphonate
potassium O-ethyl isopropylphosphonate
potassium O-phenyl methylphosphonate
potassium O-(4-methylphenyl) phenylphosphonate
potassium O-(3-chlorophenyl) 4-chlorophenylphosphonate
potassium O-(4-bromophenyl) 3-iodophenylphosphonate
potassium O-(4-methoxyphenyl) 2-fluorophenylphosphonate
potassium O-(2-chloro-4-nitrophenyl) isopropylphosphonate
potassium O-(3-methylthiophenyl) phenylphosphonate
potassium O-(4-methylsulfinylphenyl) methylphosphonate
potassium O-(4-dimethylaminophenyl) ethylphosphonate
potassium O-(3-ethylsulfonylphenyl) n-decylphosphonate
potassium S-methyl isopropylthiolophosphonate
potassium S-n-propyl methylthiolophosphonate
potassium S-(2,4-dichlorophenyl) methylthiolophosphonate
potassium S-(2,4,6-tribromophenyl) sec-butylthiolophosphonate
potassium O-(3-bromo-4-chlorophenyl) isopropylthiolophosphonate
potassium O-ethyl methylthiolophosphonate
potassium O-phenyl t-butylthiolophosphonate
potassium S-ethyl ethyldithiolophosphonate
potassium S-allyl methyldithiolophosphonate
potassium S-benzyl methyldithiolophosphonate
potassium S-(3,4-dibromophenyl) isopropyldithiolophosphonate
potassium O-ethyl ethylthionophosphonate
potassium O-n-butyl methylthionophosphonate
potassium O-(2,5-dimethylphenyl) n-hexylthionophosphonate
potassium S-ethyl isopropylthiolothionophosphonate
potassium S-phenyl t-butylthiolothionophosphonate
potassium S-benzyl n-butylthiolothionophosphonate
potassium O-methyl methylthiolothionophosphonate
potassium O-(4-methoxyphenyl) ethylthiolothionophosphonate
potassium O-(3-dimethylaminophenyl) methylthiolothionophosphonate
potassium S-methyl ethyldithiolothionophosphonate
potassium S-(2-chloro-4-methylphenyl) isopropyldithiolothionophosphonate
potassium S-(3,4-dichlorobenzyl) n-butyldithiolothionophosphonate The manner in which the compounds of the present invention can be prepared readily is illustrated in the following examples.

EXAMPLE 1

Preparation of 1-chloro-2-methoxyimino-2-methoxyethane

Ether (275 ml.) was added to a 40% aqueous solution of potassium hydroxide (85 ml.) contained in a 500 ml. Erlenmeyer flask and the resulting mixture was cooled in an ice-salt bath to −5° C. with stirring in the absence of light. N-Nitrosomethylurea (30 grams; 0.29 mol) was added over a period of about 3 minutes with stirring and continued cooling. The ether phase was then decanted into a cooled 1 liter flask and a solution of N-methoxychloroacetamide (20 grams; 0.16 mol) in ether and ethyl alcohol was slowly added, with stirring and cooling, over a period of about 2 hours. Stirring and cooling was continued for about 4 hours after the addition was completed. The reaction mixture was then allowed to warm up to room temperature and dried over anhydrous magnesium sulfate. The mixture was filtered and the filtrate was stripped of solvents. The residue was distilled and the fraction boiling between 61 and 70° C. was collected to yield 1-chloro-2-methoxyimino-2-methoxyethane.

EXAMPLE 2

Preparation of O-(2-methoxyimino-2-methoxyethyl) O-methyl methylphosphonate

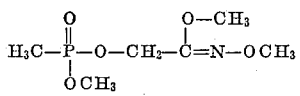

A solution of 1-chloro-2-methoxyimino-2-methoxyethane (7 grams; 0.05 mol) in methyl ethyl ketone (100 ml.) is placed in a glass reaction flask equipped with a mechanical stirrer and reflux condenser. Potassium O-methyl methylphosphonate (7.4 grams; 0.05 mol) is added and the reaction mixture is heated at reflux, with stirring, for a period of about 18 hours. After this time the reaction mixture is cooled and filtered to remove the potassium chloride which is formed. The filtered solution is stripped of solvent and the residue is redissolved in ether. The ether solution is washed with water and is dried over anhydrous magnesium sulfate. The dried solution is then evaporated under reduced pressure to yield O-(2-methoxyimino-2-methoxyethyl) O-methyl methylphosphonate.

EXAMPLE 3

Preparation of S-(2-methoxyimino-2-methoxyethyl) O-methyl phenylthionothiolophosphonate

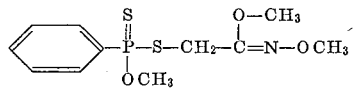

1-chloro-2-methoxyimino-2-methoxyethane (3.5 grams; 0.025 mol), potassium O-methyl phenylthionothiolophosphonate (6 grams; 0.025 mol) and methyl ethyl ketone (100 ml.) were charged into a glass reaction flask equipped with a mechanical stirrer and reflux condenser. The reaction mixture was then heated at reflux, with continuous stirring, for a period of about 18 hours. After this time the mixture was cooled and filtered to remove the potassium chloride that had formed. The filtrate was evaporated and the resulting residue was dissolved in ether containing a small amount of methylene chloride. The ether solution was washed with water and was dried over anhydrous magnesium sulfate. The dried solution was then stripped of solvents under reduced pressure to yield S-(2-methoxyimino-2-methoxyethyl) O-methyl phenylthionothiolophosphonate as the residue having a refractive index at 25° C. of 1.5789.

EXAMPLE 4

Preparation of 1-chloro-2-ethoxy-imino-2-methoxyethane

Ether (220 ml.) was added to a 40% aqueous solution of potassium hydroxide (70 ml.) contained in a 500 ml. flask, and the resulting mixture was cooled to −3° C. while stirring magnetically in the absence of light. N-nitrosomethylurea (25 grams) was then added over a period of about 5 minutes with continued stirring and cooling. The ether phase was decanted into a precooled 1 liter flask and a solution of N-ethoxy-α-chloroacetamide (18 grams; 0.13 mol) in absolute alcohol (80 ml.) and ether (80 ml.) was added dropwise over a period of about 105 minutes. Stirring was continued for about 1 hour after the addition was completed and the solution was then allowed to warm up to room temperature. The solution was then dried over magnesium sulfate and filtered. The filtrate was stripped of solvents to yield an oil as a residue. The residue was distilled under reduced pressure and the fraction boiling at 62 to 65° C. at 13 mm. Hg pressure was collected as the desired product-1-chloro-2-ethoxyimino-2-methoxyethane having a refractive index at 25° C. at 1.4556.

EXAMPLE 5

Preparation of S-(2-ethoxyimino-2-methoxyethyl) O-methyl phenylthiolothionophosphonate

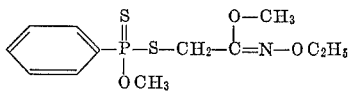

1-chloro-2-ethoxyimino-2-methoxyethane (3 grams; 0.02 mol), potassium O-methyl phenyl thiolothionophosphonate (5 grams; 0.02 mol) and methyl ethyl ketone (100 ml.) were charged into a glass reaction vessel equipped with a mechanical stirrer and reflux condenser. The reaction mixture was heated at reflux, with continuous stirring, for a period of about 18 hours. After this time the mixture was cooled and filtered to remove the potassium chloride that had formed. The filtrate was evaporated and the resulting residue was dissolved in ether. The ether solution was washed twice with water and was dried over anhydrous magnesium sulfate. The dried solution was then stripped of ether under reduced pressure to yield S-(2-ethoxyimino-2-methoxyethyl) O-methyl phenylthiolothionophosphate as a residue having a refractive index at 17° C. of 1.5720.

EXAMPLE 6

Preparation of 1-chloro-2-methoxyimino-2-ethoxyethane

A solution of N-methoxy-α-chloroacetamide (20 grams) in a 1:1 alcohol-ether mixture (200 ml.) was slowly added to an excess molar amount of a precooled, freshly prepared solution of diazoethane in ether with continuous stirring. After the addition was completed, stirring was continued for about 2 hours. After this time the mixture was warmed to room temperature and was dried over magnesium sulfate. The dried solution was stripped of solvents and the resulting residue was distilled under reduced pressure to yield 1-chloro-2-methoxyimino-2-ethoxyethane.

EXAMPLE 7

Preparation of S-(2-methoxyimino-2-ethoxyethyl) O-methyl phenylthiolothionophosphonate

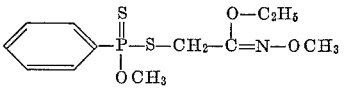

1 - chloro - 2 - methoxyimino - 2 - ethoxyethane (2.3 grams; 0.015 mol), potassium O-methyl phenylthiolothionophosphonate (3.5 grams; 0.015 mol) and methyl ethyl ketone (100 ml.) were charged into a glass reaction vessel equipped with a mechanical stirrer and reflux condenser. The reaction mixture was then heated at reflux, with stirring, for a period of about 20 hours. After this time the mixture was cooled and filtered to remove the potassium chloride which had formed. The filtered solution was evaporated and the resulting residue was dissolved in ether containing small amounts of methylene chloride. This solution was washed with water, was dried over anhydrous magnesium sulfate and was filtered. The filtrate was then stripped of solvents under reduced pressure to yield S-(2-methoxyimino-2-ethoxyethyl) O-methyl phenylthiolothionophosphonate having a refractive index of 1.5540 at 25° C.

EXAMPLE 8

Preparation of 1-chloro-2-ethoxyimino-2-ethoxyethane

A solution of N-ethoxy-α-chloroacetamide (16.5 grams) in a 1:1 alcohol-ether mixture (150 ml.) was slowly added to an excess molar amount of a precooled, freshly prepared solution of diazoethane in ether, with continuous stirring. After the addition was completed, stirring was continued for about 3 hours. After this time the mixture was dried, filtered and stripped of solvents under reduced pressure. The residue was distilled and the fraction boiling at 67 to 69° C. at 22 mm. of Hg pressure was collected as the desired product 1-chloro-2-ethoxyimino-2-ethoxyethane.

EXAMPLE 9

Preparation of S-(2-ethoxyimino-2-ethoxyethyl) O-methyl phenylthiolothionophosphonate

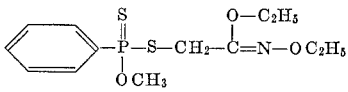

1 - chloro - 2 - ethoxyimino - 2 - ethoxyethane (2.5 grams; 0.015 mol), potassium O-methyl phenylthiolothionophosphonate (3.5 grams; 0.15 mol) and methyl ethyl ketone (100 ml.) were charged into a glass reaction flask equipped with a mechanical stirrer and reflux condenser. The reaction mixture was heated at reflux for a period of about 8 hours. After this time the mixture was filtered to remove the potassium chloride that had formed. The filtrate was stripped of solvent and the resulting residue was dissolved in ether containing a small amount of methylene chloride. This solution was washed with water, dried over magnesium sulfate and filtered. The filtrate was evaporated under reduced pressure to yield S-(2-ethoxyimino-2-ethoxyethyl) O-methyl phenylthiolothionophosphonate as a residue having a refractive index at 25° C. of 1.5431.

EXAMPLE 10

Preparation of S-(2-methoxyimino-2-ethoxyethyl) O-ethyl isopropylthiolophosphonate

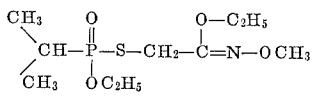

1 - chloro - 2 - methoxyimino - 2 - ethoxyethane (4.5 grams; 0.03 mol), potassium O-ethyl isopropylthiolophosphonate (6 grams; 0.3 mol) and methyl ethyl ketone (100 ml.) are charged into a glass reaction flask equipped with stirrer and reflux condenser. The reaction mixture is heated at reflux for a period of about 16 hours with continuous stirring. After this time the reaction mixture is cooled and filtered to remove the potassium chloride which has formed. The filtered solution is then evaporated under reduced pressure and the residue dissolved in an ether-methylene chloride mixture. The resulting solution is washed with water and is dried over anhydrous magnesium sulfate and filtered. The filtered solution is then stripped of solvents under reduced pressure to yield S-(2 - methoxyimino - 2 - ethoxyethyl) O-ethyl isopropylthiolophosphonate.

EXAMPLE 11

Preparation of O-(2-methoxyimino-2-ethoxyethyl) O-ethyl 4-chlorophenylphosphonate

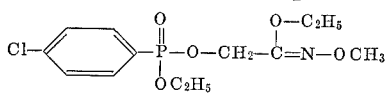

1 - chloro - 2 - methoxyimino - 2 - ethoxyethane (4.5 grams; 0.03 mol), potassium O-ethyl 4-chlorophenylphosphonate (7.7 grams; 0.03 mol) and methyl ethyl ketone (100 ml.) are charged into a glass reaction flask equipped with stirrer and reflux condenser. The reaction mixture is heated at reflux for a period of about 16 hours with continuous stirring. After this time the reaction mixture is cooled and filtered to remove the potassium chloride which has formed. The filtered solution is then evaporated under reduced pressure and the residue dissolved in an ether-methylene chloride mixture. The resulting solution is washed with water and is dried over anhydrous magnesium sulfate and filtered. The filtered solution is then stripped of solvents under reduced pressure to yield O-(2 - methoxyimino - 2 - ethoxyethyl) O - ethyl 4 - chlorophenylphosphonate.

EXAMPLE 12

Preparation of O-(2-methoxyimino - 2 - methoxyethyl) O-phenyl phenylphosphonate

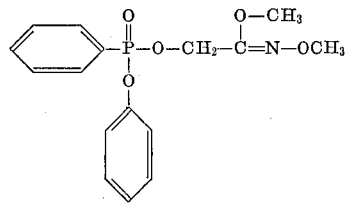

A solution of 1 - chloro-2-methoxyimino-2-methoxyethane (7 grams; 0.05 mol) in methyl ethyl ketone (100 ml.) is placed into a glass reaction flask equipped with a mechanical stirrer and reflux condenser. Potassium O-phenyl phenylphosphonate (13 grams; 0.05 mol) is added and the reaction mixture is heated at reflux, with stirring, for a period of about 18 hours. After this time the reaction mixture is cooled and filtered to remove the potassium chloride which is formed. The filtered solution is then stripped of solvent under reduced pressure and the residue is redissolved in an ether-methylene chloride mixture. The resulting solution is washed with water and dried over anhydrous magnesium sulfate. The dried solution is then filtered and evaporated to yield O-(2-methoxyimino-2-methoxyethyl) O-phenyl phenylphosphonate.

Other compounds within the scope of this invention can be prepared by the procedures described in the foregoing examples. Presented in the following examples are the essential ingredients required to prepare the indicated named compounds according to the procedures heretofore described.

EXAMPLE 13

1-chloro-2-methoxyimino - 2 - methoxyethane+potassium O-n-butyl n-pentylphosphonate=O - (2 - methoxyimino-2-methoxyethyl) O-n-butyl n-pentylphosphonate.

EXAMPLE 14

N-methoxy - α - chloroacetamide+diazo-n-propane+potassium O-n-octyl phenylphosphonate=O-(2-methoxyimino-2-n-propoxyethyl) O-n-octyl phenylphosphonate.

EXAMPLE 15

N-ethoxy - α - chloroacetamide+diazo-n-butane+potassium O-n-octyl methylphosphonate=O - (2 - ethoxyimino-2-n-butoxyethyl) O-n-octyl methylphosphonate.

EXAMPLE 16

N-isopropoxy - α - chloroacetamide+diazo-n-hexane+potassium O-n-decyl 3-bromophenylphosphonate=O-(2-isopropoxyimino-2-n-hexyloxyethyl) O-n-decyl 3-bromophenylphosphonate.

EXAMPLE 17

N-n-pentoxy - α - chloroacetamide+diazo-n-octane+potassium O-phenyl 2,4-diiodophenylphosphonate=O-(2-n-pentoxyimino-2-n-octyloxyethyl) O-phenyl 2,4-diiodophenylphosphonate.

EXAMPLE 18

N - decyloxy - α - chloroacetamide+diazomethane+potassium O-benzyl 3 - fluorophenylphosphonate=O-(2-decyloxyimino-2-methoxyethyl) O-benzyl 3-fluorophenylphosphonate.

EXAMPLE 19

N-methoxy - α - chloroacetamide+diazoethane+potassium O-phenylethyl 3,4 - dimethylphenylthionophosphonate=O-(2 - methoxyimino-2-ethoxyethyl) O-phenylethyl 3,4-dimethylphenylthionophosphonate.

EXAMPLE 20

N-methoxy - α - chloroacetamide+diazomethane+potassium S-phenyl methylthiolophosphonate=O-(2-methoxyimino-2-methoxyethyl) S - phenyl methylthiolophosphonate.

EXAMPLE 21

N-t-butoxy - α - chloroacetamide+diazomethane+potassium O-(2 - methoxyphenyl) isopropylphosphonate= O-(2-t-butoxyimino - 2 - methoxyethyl) O-(2-methoxyphenyl) isopropylphosphonate.

EXAMPLE 22

N-methoxy - α - chloroacetamide+diazopentane+potassium O-(4-isopropylphenyl) 3 - nitrophenylphosphonate=O-(2-methoxyimino - 2 - pentyloxyethyl) O-(4-isopropylphenyl) 3-nitrophenylphosphonate.

EXAMPLE 23

1 - chloro-2-methoxyimino-2-methoxyethane+potassium S - (3-methylsulfonylphenyl)benzyldithiolophosphonate=S-(2-methoxyimino-2-methoxyethyl) S-(3-methylsulfonylphenyl)benzyldithiolophosphonate.

EXAMPLE 24

1 - chloro-2-methoxyimino-2-ethoxyethane+potassium O - (2-ethylthiophenyl)ethylthiolothionophosphonate=S-(2-methoxyimino-2-ethoxyethyl) O - (2-ethylthiophenyl) ethylthiolothionophosphonate.

EXAMPLE 25

1 - chloro-2-ethoxyimino-2-ethoxyethane+potassium S-(4 - isopropylthiophenyl)2 - ethoxyphenylthiolophosphonate=O-(2-ethoxyimino-2-ethoxyethyl) S - (4-isopropylthiophenyl)2-ethoxyphenylthiolophosphonate.

EXAMPLE 26

1-chloro-2-ethoxyimino - 2 - methoxyethane+potassium O-(3-methylsulfinylphenyl) decylphosphonate=O-(2-ethoxyimino - 2 - methoxyethyl) O-(3-methylsulfinylphenyl) decylphosphonate.

EXAMPLE 27

1-chloro-2-methoxyimino - 2 - methoxyethane+potassium O-(3 - pentoxyphenyl) 2,4,6 - trichlorophenylphosphonate=O-(2-methoxyimino - 2 - methoxyethyl) O-(3-pentoxyphenyl) 2,4,6-trichlorophenylphosphonate.

EXAMPLE 28

1-chloro-2-methoxyimino-2-methoxyethane+potassium O-(4-decyloxyphenyl) 2,4-dinitrophenylphosphonate=O-(2-methoxyimino-2-methoxyethyl) O-(4-decyloxyphenyl) 2,4-dinitrophenylphosphonate.

EXAMPLE 29

N-isopropoxy-α - chloroacetamide+diazomethane+potassium O-(3,5-di-n-butylbenzyl) 2,6-dimethoxy-4-chlorophenylthiolophosphonate=S-(2-isopropoxyimino - 2-methoxyethyl) O-(3,5-di-n-butylphenyl) 2,6 - dimethoxy-4-chlorophenylthiolophosphonate.

EXAMPLE 30

N-n-butoxy - α - chloroacetamide+diazomethane+potassium O-(4-pentylthiophenyl) 3-dimethylaminobenzylthionophosphonate=O-(2-n-butoxyimino - 2 - methoxyethyl) O-(4-pentylthiophenyl) 3 - dimethylaminophenylthionophosphonate.

EXAMPLE 31

N-ethoxy - α - chloroacetamide+diazohexane+potassium S-(3-diethylaminophenyl) 4-n-butylsulfonylbenzylthiolophosphonate=O-(2-ethoxyimino-2 - hexyloxyethyl) S - (3 - diethylaminophenyl) - 4 - n - butylsulfonylbenzylthiolophosphonate.

EXAMPLE 32

N-methoxy-α-chloroacetamide+diazo-n - propane+potassium S-(4-di-n-pentylaminophenyl) 2,4-dibromobenzyldithiolophosphonate=S-(2-methoxyimino-2-n - propoxyethyl) S-(4-di-n-pentylaminophenyl) 2,4-dibromobenzyldithiolophosphonate.

EXAMPLE 33

1-chloro-2-methoxyimino-2-methoxyethane+potassium O - (4-isopropylsulfinylphenyl) allylphosphonate=O-(2-methoxyimino-2-methoxyethyl) O-(4 - isopropylsulfinylphenyl) allylphosphonate.

EXAMPLE 34

1-chloro-2-ethoxyimino-2-ethoxyethane+potassium O-(2,4-dinitrophenyl) 2-pentenylthionophosphonate=O-(2-ethoxyimino-2-ethoxyethyl) O-(2,4-dinitrophenyl) 2-pentenylthionophosphonate.

EXAMPLE 35

1-chloro-2-methoxyimino-2 - ethoxyethane+potassium S-(2-chloro - 4 - allylphenyl) 4 - octenyltrithiophosphonate=S-(2-methoxyimino-2-ethoxyethyl) S-(2-chloro - 4-allylphenyl) 4-octenyltrithiophosphonate.

EXAMPLE 36

1-chloro-2-methoxyimino-2-methoxyethane+potassium O-(3-chloro-5-hex-3-enylphenyl) 3-phenylpropylphosphonate=O-(2-methoxyimino-2-methoxyethyl) O-(3-chloro-5-hex-3-enylphenyl) 3-phenylpropylphosphonate.

EXAMPLE 37

N-decyloxy-α - chloroacetamide+diazomethane+potassium O-decyl decylphosphonate=O-(2-decyloxyimino-2-methoxyethyl) O-decyl decylophosphate.

EXAMPLE 38

N-methoxy-α - chloroacetamide+diazodecane+potassium O-5-octenyl 4-allylphenylthiolothionophosphonate=S-(2-methoxyimino-2-decyloxyethyl) O-5-octenyl 4-allylphenylthiolothionophosphonate.

For practical use as insecticides or acaricides, the compounds of this invention are generally incorporated into insecticidal or acaricidal compositions which comprise an inert carrier and an insecticidally or acaricidally toxic amount of such a compound. Such insecticidal or acaricidal compositions, which can also be called formulations, enable the active compound to be applied conveniently to the site of the insect or acarid infestation in any desired quantity. These compositions can be solids such as dusts, granules or wettable powders; or they can be liquids such as solutions, aerosols or emulsifiable concentrates.

For example, dusts can be prepared by grinding and blending the active compound with a solid insert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water and/or oil to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of insecticides or acaricides can be dispersed under superatmospheric pressure as aerosols. However, preferred liquid insecticidal or acaricidal compositions are emulsifiable concentrates, which comprise an active compound according to this invention and as the inert carrier, a solvent and an emulsifier. Such emulsifiable concentrates can be extended with water and/or oil to any desired concentration of active compound for application as sprays to the site of the insect or acarid infestation. The emulsifiers most commonly used in these concentrates are nonionic or mixtures of nonionic with anionic surface-active agents.

A typical insecticidal or acaricidal composition according to this invention is illustrated by the following example, in which the quantities are in parts by weight.

EXAMPLE 39

Preparation of a dust

Product of Example 2 _____ 10
Powdered talc _____ 90

The above ingredients are mixed in a mechanical grinder-blender and are ground until a homogeneous, free-flowing dust of the desired particle size is obtained. This dust is suitable for direct application to the site of the insect or acarid infestation.

The compounds of this invention can be applied as insecticides or acaricides in any manner recognized by the art. One method for destroying insects or acarids comprises applying to the locus of the insect or acarid infestation, an insecticidal or acaricidal composition comprising an inert carrier and, as an essential active ingredient, in a quantity which is toxic to said insects or acarids, a compound of the present invention. The concentration of the new compounds of this invention in the insecticidal or acaricidal compositions will vary greatly with the type of formulation and the purpose for which it is designed, but generally the insecticidal or acaricidal compositions will comprise from about 0.05 to about 95 percent by weight of the active compounds of this invention. In a preferred embodiment of this invention, the insecticidal or acaricidal compositions will comprise from about 5 to 75 percent by weight of the active compound. The compositions can also comprise such additional substances as other pesticides, stabilizers, spreaders, deactivators, adhesives, stickers, fertilizers, activators, synergists, and the like.

The compounds of the present invention are also useful when combined with other insecticides or acaricides in the compositions heretofore described. These other insecticides or acaricides can comprise from about 5% to about 95% of the active ingredients in the compositions. Use of the combinations of these other insecticides or acaricides with the compounds of the present invention provide insecticidal and/or acaricidal compositions which are more effective in controlling insects or acarids and often provide results unattainable with separate compositions of the individual compounds. The other insecticides or acaricides with which the compounds of this invention can be used in the insecticidal or acaricidal compositions to control insects or acarids include halogenated compounds such as DDT, methoxychlor, TDE, lindane, chlordane, isobenzan, aldrin, dieldrin, heptachlor, endrin, mirex, endosulfon, dicofol, and the like; organic phosphorus compounds such as TEPP, schradan, ethion, parathion, methyl parathion, EPN, demeton, carbophenothion, phorate, zinophos, diazinon, malathion, mevinphos, dimethoate, DBD, ronnel, oxydemeton-methyl, dicapthon, chlorothion, phosphamidon, naled, fenthion, trichlorofon, DDVP, and the like; organic nitrogen compounds such as dinitro-o-cresol, dinitrocyclohexylphenyl, DNB, DNP, binapacril, azobenzene, and the like; organic carbamate compounds such as carbaryl, ortho 5353, and the like; organic sulfur compounds such as phenothiazine, phenoxathin, lauryl thioyanate, [bis(2-thiocyanoethyl)ether], isobornyl thiocyanoacetate, and the like; as well as such substances usually referred to as fumigants, as hydrogen cyanide, carbon tetrachloride, calcium cyanide, carbon disulfide, ethylene dichloride, propylene dichloride, ethylene dibromide, ethylene oxide, methyl bromide, paradichlorobenzene, and the like.

The compounds of the present invention can also be combined with fungicidal and nematocidal chemical compounds to form pesticidal compositions useful for the control of fungi and in some cases soil nematodes as well as insects or acarids. Typical examples of such fungicidal chemical compounds are ferbam, nabam, zineb, ziram, thiram, chloranil, dichlone, glyodin, cycloheximide, dinocap, maneb, captan, dodine, PCNB, p-dimethylaminobenzenediazo sodium sulfonate, and the like; while examples of nematocidal compounds are chloropicrin, O,O-diethyl o - (2,4 - dichlorophenyl)phosphorothioate, tetrachlorothiophene, dazomet, dibromochloropropane, and the like.

The new compounds of this invention can be used in many ways for the control of insects or acarids. Insecticides or acaricides which are to be used as stomach poisons or protective materials can be applied to the surface on which the insects or acarids feed or travel. Insecticides or acaricides which are to be used as contact poisons or eradicants can be applied directly to the body of the insect or acarid, as a residual treatment to the surface on which the insect or acarid may walk or crawl, or as a fumigant treatment of the air which the insect or acarid breathes. In some cases, the compounds applied to the soil or plant surfaces are taken up by the plant, and the insects or acarids are poisoned systemically.

The above methods of using insecticides are based on the fact that almost all the injury done by insects is a direct or indirect result of their attempts to secure food. Indeed, the large number of destructive insects can be classified broadly on the basis of their feeding habits. Among the insects which can be effectively controlled by the compounds of the present invention are the chewing insects, such as the Mexican bean beetle and the southern armyworm; the piercing-sucking insects, such as the pea aphid, the cereal leaf beetle, the housefly, grape leafhopper, the chinch bug, the lygus bug, the oyster shell scale, the California red scale, the Florida red scale, the soft scale and mosquitoes; the internal feeders, including borers, such as the European corn borer, the peach twig borer and the corn earworm, worms or weevils, such as the codling moth, the alfalfa weevil, the cotton boll weevil, the pink boll worm, the plum curculio, the red banded leaf roller, the melonworm, the cabbage looper and the apple maggot, leaf miners, such as the apple leaf miner, the birch leaf miner and the beet leaf miner, and gall insects, such as the wheat joint worm and the grape phylloxera. Insects which attack below the surface of the ground are classified as subterranean insects and include such destructive pests as the woolly apple aphid, the Japanese beetle, the onion maggot and the corn rootworm.

Mites and ticks are not true insects. Many economically important species of mites and ticks can be controlled by the compounds of this present invention, such as the red spider mite, the two-spotted mite, the strawberry spider mite, the citrus rust mite, the cattle tick, the poultry mite, the citrus red mite and the European red mite. Chemicals useful for the control of mites are often called miticides, while those useful for the control of both mites and ticks are known specifically as acaricides.

The quantity of active compound of this invention to be used for insect or acarid control will depend on a variety of factors, such as the specific insect involved, intensity of the infestation, weather, type of environment, type of formulation, and the like. For example, the application of only one or two ounces of active chemical per acre may be adequate for control of a light infestation of an insect or acarid under conditions unfavorable of its feeding, while a pound or more of active compound per acre may be required for the control of a heavy infestation of insects or acarids under conditions favorable to their development.

The insecticidal activity of the compounds of the present invention was demonstrated by experiments carried out for the control of a variety of insects.

In one experiment, designated as the housefly knockdown test, fifty three day old unsexed adult houseflies (Musca domestica) were anesthetized with carbon dioxide gas and placed into a fine mesh wire cage. The flies were allowed to recover completely from the effects of the carbon dioxide gas and were then sprayed with a formulation containing the indicated concentration of test compound. After 30 minutes the knockdown value of the test compound is determined. Knockdown is considered as an individual fly that is unable to move its body length, and the knockdown value is given as a percent of down flies based upon the number of down flies in comparison to a control. The results of this experiment are shown in Table I.

In another experiment carried out for the control of the housefly, designated as the housefly topical test, each of fifty flies was contacted with a test compound by applying 1 ml. of test formulation, containing the indicated concentrations of active compound, to the dorsum of its thorax. The flies were then placed in a wire mesh cage where they were supplied with sugar syrup. At the end of a 24 hour period the mortality of the flies was observed and rated in comparison to a control. The results of this experiment are also shown in Table I.

TABLE I

| Test compound | Concentration of test compound in p.p.m. | Percent control Housefly knockdown test | Percent control Housefly topical test |
|---|---|---|---|
| Product of: | | | |
| Example 3 | 3,500 | 82 | 100 |
| Do | 1,000 | | 100 |
| Do | 100 | | 98 |
| Example 5 | 3,500 | | 100 |
| Do | 1,000 | 90 | 100 |
| Do | 100 | 86 | 86 |

The insecticidal activity of the compounds of this invention was further illustrated in experiments carried out for the control of the pea aphid (Acyrthosiphon pisum) by contact. In these experiments ten day old Laxton pea plants contained in small plastic pots were each infested with ten adult pea aphids. The plants and pea aphids were then sprayed with the test compound formulated as an aqueous emulsion of an acetone solution at various concentrations. The infested plants were then placed in a holding chamber maintained at a constant temperature for a period of 48 hours. After this time the mortality of the aphids was determined and rated on a percent basis in comparison to a control. The results of this experiment are shown in Table II.

TABLE II

| Test compound | Concentration of test compound in p.p.m. | Percent control of pea aphids, contact test |
|---|---|---|
| Product of: | | |
| Example 3 | 3,500 | 100 |
| Example 5 | 3,500 | 100 |

The acaricidal activity of the compounds of the present invention was demonstrated in experiments carried out for the control of the two-spotted spider mite (Tetranychus urticae).

In one experiment wherein the activity of the compounds of the present invention as contact poisons was determined, the test compounds were formulated at the indicated dosages, as aqueous emulsions of acetone solutions and were sprayed onto Henderson bush lima bean plants, each infested with about 100 adult two-spotted spider mites. The treated plants were then placed into a holding room and were supplied with their daily requirement of water and light. After a period of 5 days the mortality of the mites is determined and is rated on a percentage basis in comparison to untreated controls. The results of this experiment are shown in Table III.

TABLE III

| Test compound | Concentration of test compound in p.p.m. | Percent mortality |
|---|---|---|
| Product of: | | |
| Example 3 | 3,500 | 100 |
| Do | 1,000 | 96 |
| Example 5 | 3,500 | 100 |
| Do | 1,000 | 96 |

We claim:
1. A compound of the formula

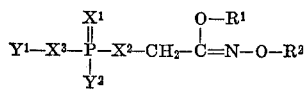

wherein $Y^1$ and $Y^2$ are independently selected from the group consisting of lower alkyl, lower alkenyl and

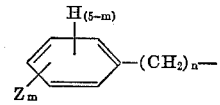

wherein Z is selected from the group consisting of lower alkyl, lower alkenyl, lower alkoxy, lower alkylthio, bromine, chlorine, nitro, lower alkylsulfoxide, lower alkylsulfone and diloweralkylamino, $m$ is an integer from 0 to 5, and $n$ is an integer from 0 to 3; $R^1$ and $R^2$ are alkyl; and $X^1$, $X^2$ and $X^3$ are independently selected from the group consisting of oxygen and sulfur.

2. The compound of claim 1, S-(2-methoxyimino-2-methoxyethyl) O-ethyl isopropylthiolophosphonate.
3. The compound of claim 1, S-(2-methoxyimino-2-ethoxyethyl) O-ethyl isopropylthiolophosphonate.
4. The compound of claim 1, S-(2-methoxyimino-2-methoxyethyl) O-methyl phenylthionothiolophosphonate.
5. The compound of claim 1, O-(2-methoxyimino-2-methoxyethyl) O-methyl methylphosphonate.
6. The compound of claim 1, O-(2-n-butoxyimino-2-ethoxyethyl) O-(4-chlorophenyl) phenylphosphonate.
7. The compound of claim 1, O-(2-isopropoxyimino-2-methoxyethyl) S-(3-methylphenyl) n-propylthiolophosphonate.

No references cited.

CHARLES B. PARKER, Primary Examiner

A. H. SUTTO, Assistant Examiner

U.S. Cl. X.R.

260—453R, 978; 424—211